(12) United States Patent
Mutsuo

(10) Patent No.: US 10,742,838 B2
(45) Date of Patent: Aug. 11, 2020

(54) IMAGE PROCESSING APPARATUS WITH AN IMPROVED DITHERING PROCESSING

(71) Applicant: KYOCERA Document Solutions Inc., Osaka (JP)

(72) Inventor: Toshiaki Mutsuo, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 16/363,184

(22) Filed: Mar. 25, 2019

(65) Prior Publication Data

US 2019/0306369 A1    Oct. 3, 2019

(30) Foreign Application Priority Data

Mar. 29, 2018    (JP) .................. 2018-064954

(51) Int. Cl.
*H04N 1/405*    (2006.01)
*H04N 1/407*    (2006.01)

(52) U.S. Cl.
CPC ......... *H04N 1/4055* (2013.01); *H04N 1/4072* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,949,966 A * | 9/1999 | Hayashi | ............... | H04N 1/4105 358/1.9 |
| 6,731,400 B1 * | 5/2004 | Nakamura | ............. | G06K 15/00 358/1.9 |
| 7,251,060 B2 * | 7/2007 | Tonami | ................ | H04N 1/4053 358/3.16 |
| 2001/0019632 A1 * | 9/2001 | Shibaki | ..................... | G06T 9/00 382/252 |
| 2006/0050318 A1 * | 3/2006 | Miyagi | ................. | H04N 1/405 358/3.13 |
| 2009/0091796 A1 * | 4/2009 | Hirota | ...................... | H04N 1/52 358/3.13 |
| 2014/0285851 A1 * | 9/2014 | Kawamoto | ........ | G06K 15/1881 358/3.09 |

FOREIGN PATENT DOCUMENTS

| JP | 2002-044445 | 2/2002 |
|---|---|---|
| JP | 2003-189099 | 7/2003 |

* cited by examiner

*Primary Examiner* — Dung D Tran

(57) ABSTRACT

An image processing apparatus includes a multi-gradation-level dither processing unit and a screen processing unit. The multi-gradation-level dither processing unit performs a multi-gradation-level dither process for a target image. The screen processing unit performs an FM screen process for the target image for which the multi-gradation-level dither process has been performed. Further, in the multi-gradation-level dither process, the multi-gradation-level dither processing unit selects each pixel in the target image as a target pixel in turn; using a conversion characteristic corresponding to each local pixel position group in a unit matrix, converts a pixel value of the target pixel to one of: a minimum gradation level, a maximum gradation level and an intermediate gradation level corresponding to the pixel value of the target pixel; and sets a pixel value of each pixel in the unit matrix as a pixel value obtained with the conversion characteristic.

6 Claims, 4 Drawing Sheets

FIG. 2

| P3 | P2 | P3 | P4 | P5 | P4 | P3 | P2 | P3 | P4 | P5 | P4 |
|----|----|----|----|----|----|----|----|----|----|----|----|
| P2 | P1 | P2 | P5 | P6 | P5 | P2 | P1 | P2 | P5 | P6 | P5 |
| P3 | P2 | P3 | P4 | P5 | P4 | P3 | P2 | P3 | P4 | P5 | P4 |
| P4 | P5 | P4 | P3 | P2 | P3 | P4 | P5 | P4 | P3 | P2 | P3 |
| P5 | P6 | P5 | P2 | P1 | P2 | P5 | P6 | P5 | P2 | P1 | P2 |
| P4 | P5 | P4 | P3 | P2 | P3 | P4 | P5 | P4 | P3 | P2 | P3 |
| P3 | P2 | P3 | P4 | P5 | P4 | P3 | P2 | P3 | P4 | P5 | P4 |
| P2 | P1 | P2 | P5 | P6 | P5 | P2 | P1 | P2 | P5 | P6 | P5 |
| P3 | P2 | P3 | P4 | P5 | P4 | P3 | P2 | P3 | P4 | P5 | P4 |

101

IMAGE PROCESSING APPARATUS WITH AN IMPROVED DITHERING PROCESSING

CROSS-REFERENCE TO RELATED APPLICATIONS

This application relates to and claims priority rights from Japanese Patent Application No. 2018-064954, filed on Mar. 29, 2018, the entire disclosures of which are hereby incorporated by reference herein.

BACKGROUND

1. Field of the Present Disclosure

The present disclosure relates to an image processing apparatus.

2. Description of the Related Art

An AM (Amplitude Modulation) screen process or an FM (Frequency Modulation) screen process is used to perform halftoning for a multi-gradation-level image. The AM screen process changes a size of halftone dots in accordance with a gradation level to be expressed, and the FM screen process changes a density of halftone dots in accordance with a gradation level to be expressed.

The AM screen process can be performed using a systematic dither method or the like, for example. The FM screen process can be performed using an error diffusion method, a minimized average error method or the like, for example.

A technique has been proposed that in an error diffusion method, halftone dots are clusterized by cyclically modulating a quantization threshold value.

Further, in general, processing time of a systematic dither method is shorter than processing time of an error diffusion method. Therefore, a blue noise mask method using a systematic dither method has been proposed to obtain a quality halftone expression like an error diffusion method.

As mentioned, in a clusterization technique for an error diffusion method, the quantization threshold is forcibly modulated in an amplitude modulation manner, and therefore, if an error to be diffused gets large, then halftone dots may not be concentrated.

Further, when obtaining a quality halftone expression using a systematic dither method as mentioned, the method requires a very large size of a threshold matrix, and therefore, requires a large memory area to memorize the threshold matrix while performing the halftoning process.

For example, when the threshold matrix is memorized in a SRAM (Static Random Access Memory) for high speed, and the threshold matrix is read from the SRAM to perform the halftoning process, a large capacity of the SRAM is required and consequently results in a high cost of the apparatus.

SUMMARY

An image processing apparatus according to an aspect of the present disclosure includes a multi-gradation-level dither processing unit and a screen processing unit. The multi-gradation-level dither processing unit is configured to perform a multi-gradation-level dither process for a target image. The screen processing unit is configured to perform an FM screen process for the target image for which the multi-gradation-level dither process has been performed. Further, in the multi-gradation-level dither process, the multi-gradation-level dither processing unit (a) selects each pixel in the target image as a target pixel in turn, (b) using a conversion characteristic corresponding to each local pixel position group in a unit matrix, convert a pixel value of the target pixel to one of: (b1) a minimum gradation level, (b2) a maximum gradation level and (b3) an intermediate gradation level corresponding to the pixel value of the target pixel, and set a pixel value of each pixel in the unit matrix as a pixel value obtained with the conversion characteristic.

These and other objects, features and advantages of the present disclosure will become more apparent upon reading of the following detailed description along with the accompanied drawings.

BRIEF DESCRIPTION OF THE DRAWINGS

FIG. 2 shows a diagram that indicates an example of a unit matrix used by a multi-gradation-level dither processing unit 33;

DETAILED DESCRIPTION

Hereinafter, an embodiment according to an aspect of the present disclosure will be explained with reference to drawings.

Figure 1:
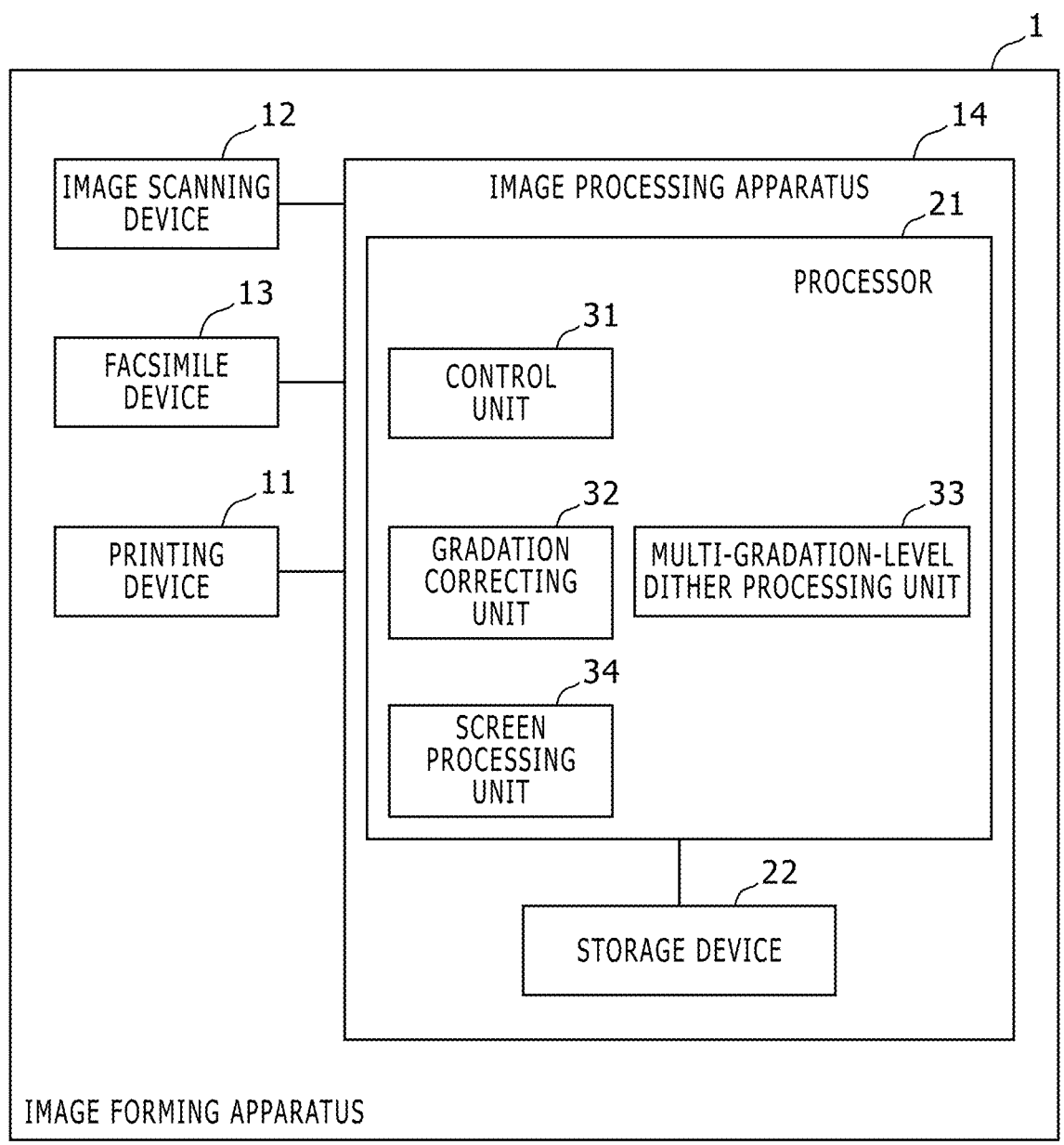
FIG. 1 shows a block diagram that indicates a configuration of an image forming apparatus that includes an image processing apparatus according to an embodiment of the present disclosure.

FIG. 1 shows a block diagram that indicates a configuration of an image forming apparatus that includes an image processing apparatus according to an embodiment of the present disclosure. The image forming apparatus 1 shown in FIG. 1 is a multi function peripheral. Alternatively, the image forming apparatus 1 may be a printer, a copier or the like.

This image forming apparatus 1 includes a printing device 11, an image scanning device 12, a facsimile device 13, and an image processing apparatus 14.

The printing device 11 is an internal device which prints a document image based on raster image data. For example, the printing device 11 performs printing of the document image based on image data for which image processing has been performed by the image processing apparatus 14.

The image scanning device 12 is an internal device which optically scans a document image of a document using an imaging sensor and generates image data of the document image.

The facsimile device 13 is an internal device which generates a facsimile signal from image data of a document image to be transmitted and transmits the facsimile signal, and receives a facsimile signal and converts it to image data.

The image processing apparatus 14 performs image processing for image data generated by the image scanning device 12, the facsimile device 13 or the like. For example, the image processing apparatus 14 performs halftoning for an original image having multi gradation levels The image processing apparatus 14 includes a processor 21 and a storage device 22. The processor 21 includes an ASIC (Application Specific Integrated Circuit), a microcomputer and/or the like, and acts as processing units using the ASIC, the microcomputer and/or the like. The storage device 22 is a nonvolatile storage device such as flash memory, and stores a program, data and/or the like for the processor 21.

Here the processor 21 acts as a control unit 31, a gradation correcting unit 32, a multi-gradation-level dither unit 33, and a screen processing unit 34.

The control unit 31 controls internal devices such as the printing device 11, the image scanning device 12 and the facsimile device 13, and causes the gradation correcting unit 32, the multi-gradation-level dither processing unit 33 and the screen processing unit 34 to perform a predetermined process for a target image (here, a multi-gradation-level image as an original image of an image to be printed).

The gradation correcting unit 32 corrects a gradation level of the target image. Here, in accordance with a gradation characteristic of the printing device 11, a gradation level of the target image is corrected so as to linearize the gradation characteristic of the printing device 11 for a characteristic of gradation levels of the target image. For example, the gradation correcting unit 32 includes a lookup table and performs a gamma correction referring to the lookup table and thereby obtains a corrected gradation level from an original gradation level (i.e. from a gradation level before the correction).

The multi-gradation-level dither processing unit 33 performs a multi-gradation-level dither process for a target image (here, the target image for which the aforementioned gradation correction has been performed).

Specifically, in the multi-gradation-level dither process, the multi-gradation-level dither processing unit 33 (a) selects each pixel in the target image as a target pixel in turn, (b) using a conversion characteristic corresponding to each local pixel position group in a unit matrix, converts a pixel value of the target pixel to one of: (b1) a minimum gradation level, (b2) a maximum gradation level and (b3) an intermediate gradation level corresponding to the pixel value of the target pixel, and sets a pixel value of each pixel in the unit matrix as a pixel value obtained with the conversion characteristic (i.e. as the converted pixel value).

Thus, a pixel value in multi gradation levels of an original image is converted to pixel values (in multi gradation levels consisting of the minimum gradation level, the maximum gradation level and the aforementioned intermediate gradation level) of plural pixels in the unit matrix.

The aforementioned conversion characteristic has two threshold values corresponding to each local pixel position group, and (a) converts the pixel value of the target pixel to the minimum gradation level if the pixel value of the target pixel is lower than one of the two threshold values, (b) converts the pixel value of the target pixel to the maximum gradation level if the pixel value of the target pixel is higher than the other of the two threshold values, and (c) converts the pixel value of the target pixel to the intermediate gradation level if the pixel value of the target pixel is between the two threshold values.

Figure 3:
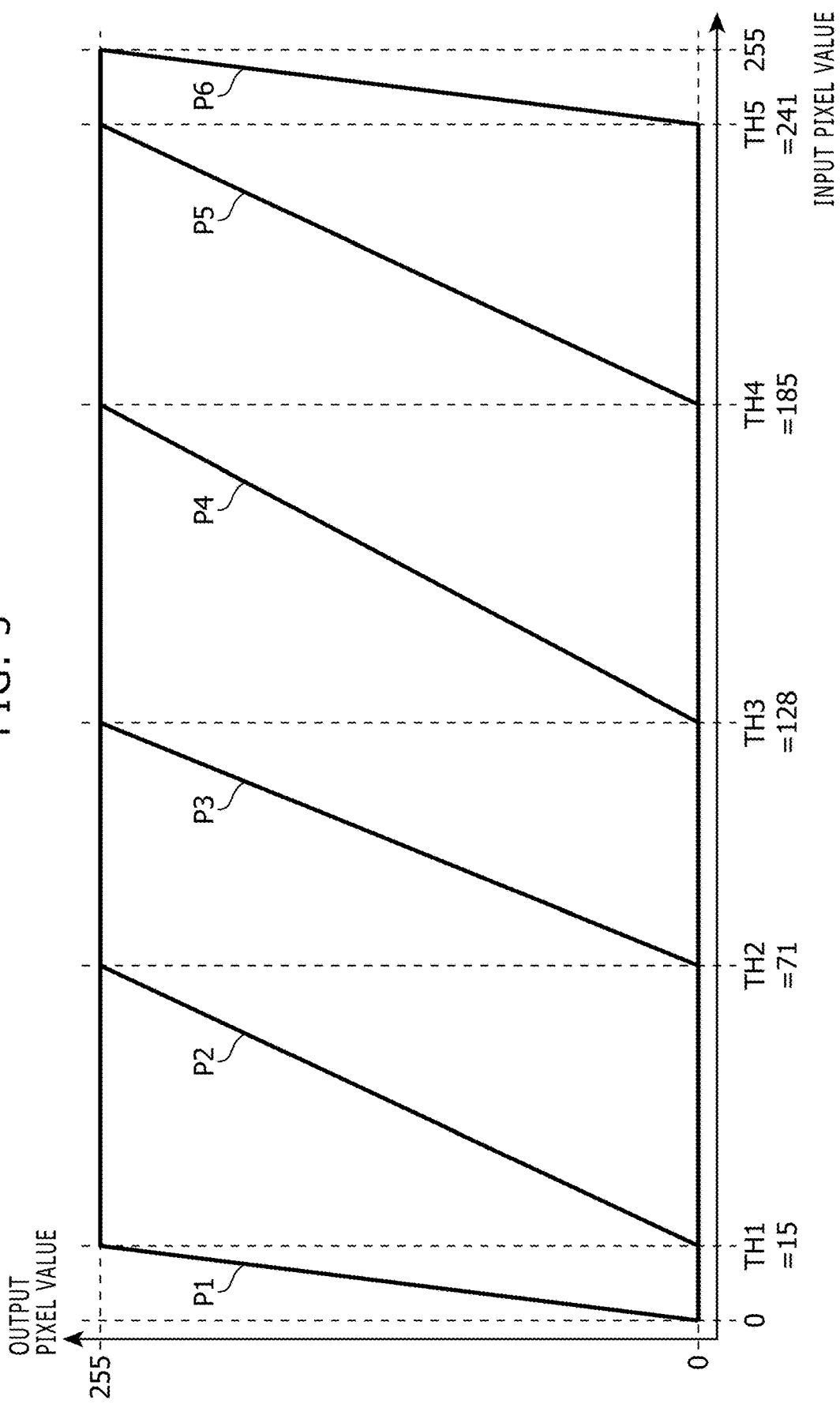
FIG. 3 shows a diagram that indicates an example of conversion characteristics used by a multi-gradation-level dither processing unit 33.
Figure 4:
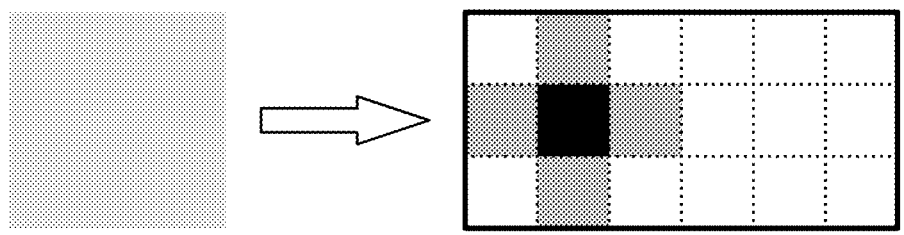
FIG. 4 shows a diagram that explains a multi-gradation-level dither process based on a unit matrix 101 shown in FIG. 2 and conversion characteristics shown in FIG. 3.
Figure 4:
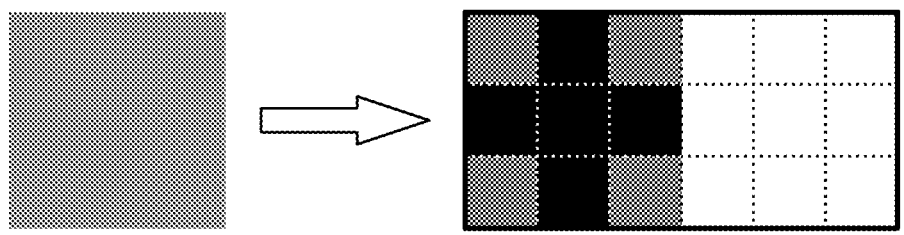
Figure 4:
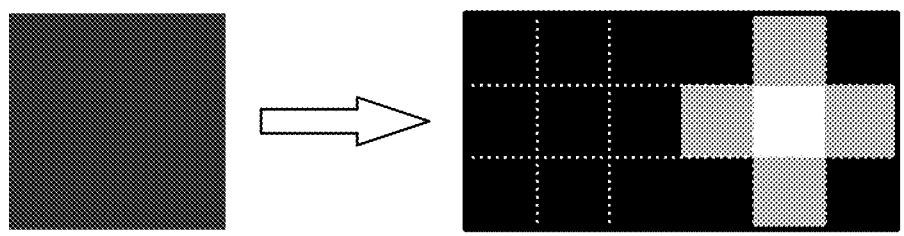

FIG. 2 shows a diagram that indicates an example of a unit matrix used by the multi-gradation-level dither processing unit 33. FIG. 3 shows a diagram that indicates an example of conversion characteristics used by the multi-gradation-level dither processing unit 33. FIG. 4 shows a diagram that explains a multi-gradation-level dither process based on a unit matrix 101 shown in FIG. 2 and conversion characteristics shown in FIG. 3.

A unit matrix 101 shown in FIG. 2 has a size of horizontal six pixels by vertical three pixels. For the unit matrix 101, six local pixel position group P1 to P6 are set, and for P1 to P6, conversion characteristics shown in FIG. 3 are set, respectively. Each of the conversion characteristics is a continuous characteristic.

The conversion characteristic of the local pixel position group P2 has threshold values TH1 and TH2, and has a linear characteristic for a range between the threshold values TH1 and TH2; the conversion characteristic of the local pixel position group P3 has the threshold value TH2 and a threshold value TH3, and has a linear characteristic for a range between the threshold values TH2 and TH3; the conversion characteristic of the local pixel position group P4 has the threshold value TH3 and a threshold value TH4, and has a linear characteristic for a range between the threshold values TH3 and TH4; and the conversion characteristic of the local pixel position group P5 has the threshold value TH4 and a threshold value TH5, and has a linear characteristic for a range between the threshold values TH4 and TH5. Here the number of the threshold values (here, TH1 to TH5) is smaller by 1 than the number of the local pixel position groups (here, P1 to P6); and the threshold values (here, TH1 to TH5) have a relationship of 0 (i.e. minimum gradation level)<TH1<TH2<TH3<TH4<TH5<255 (i.e. maximum gradation level). In addition, the conversion characteristic of the local pixel position group P1 has a linear characteristic for a range between 0 (i.e. minimum gradation level) and the threshold value TH1; and the conversion characteristic of the local pixel position group P6 has a linear characteristic for a range between the threshold value TH5 and 255 (i.e. maximum gradation level).

On the basis of the unit matrix 101 shown in FIG. 2 and the conversion characteristics shown in FIG. 3, a pixel set is generated of which a density pattern corresponds to one pixel value of the original image, as shown in FIG. 4.

Further, for example, the multi-gradation-level dither processing unit 33 arranges the aforementioned threshold values (e.g. TH1 to TH5 shown in FIG. 3) on an SRAM and performs the conversion of a pixel value of the target pixel at high speed referring to the threshold value on the SRAM.

Further, if the pixel value of the target pixel is neither the minimum gradation level nor the maximum gradation level, then the multi-gradation-level dither processing unit 33 (a) sets a pixel value as the intermediate gradation level using the conversion characteristic in one of local pixel position groups (e.g. any one of P1 to P6 in FIG. 2) in the unit matrix, and (b) sets a pixel value as either the minimum gradation level or the maximum gradation level in the one or more other local pixel position groups (e.g. remaining 5 groups of P1 to P6 in FIG. 2) in the unit matrix.

If a pixel value of the target pixel is the minimum gradation level, then on the basis of the aforementioned conversion characteristic, all pixel values of all local pixel position groups in the unit matrix are set as the minimum gradation level; and if a pixel value of the target pixel is the maximum gradation level, then on the basis of the aforementioned conversion characteristic, all pixel values of all local pixel position groups in the unit matrix are set as the maximum gradation level.

Further, the multi-gradation-level dither processing unit 33 (a) may select a conversion characteristic corresponding to a property (e.g. photograph property, character property or the like) of the target pixel from plural conversion characteristics (here, plural sets of the threshold values corresponding to all of the conversion characteristics), (b) using the selected conversion characteristic, may convert the pixel value of the target pixel to one of: the minimum gradation level, the maximum gradation level and the intermediate gradation level, and (c) may set a pixel value of each pixel in the unit matrix as the pixel value obtained with the conversion characteristic. Further, the gradation correcting unit 32 may select a lookup table corresponding to the property of the target pixel from plural lookup table, and may perform a gamma correction based on the selected lookup table.

The screen processing unit 34 performs an FM screen process for the target image for which the aforementioned multi-gradation-level dither process has been performed. Here, as the FM screen process, for example, the screen processing unit 34 performs halftoning based on an error diffusion method, halftoning based on a minimized average error method or the like.

The following part explains a behavior of the aforementioned image processing apparatus 14.

When the control unit 31 obtains a target image, firstly, the gradation correcting unit 32 performs the aforementioned gradation correction for the target image.

Subsequently, the multi-gradation-level dither processing unit 33 performs the multi-gradation-level dither process for the target image for which the gradation correction has been performed. Consequently, pixel values continuously change and therefore dots grow in an AM screen manner.

Further, the screen processing unit 34 performs the FM screen process for the target image for which the multi-gradation-level gradation-level dither process has been processed. In this process, in the target image for which the multi-gradation-level dither process has been processed, (a) a pixel value of a pixel having the maximum gradation level is maintained as the maximum gradation level even after the FM screen process, (b) a pixel value of a pixel having the minimum gradation level is maintained as the minimum gradation level even after the FM screen process, and (c) a pixel value of a pixel having an intermediate gradation level is quantized (e.g. binarized or converted with 5 threshold values to one of predetermined 6 values) in the FM screen process.

Consequently, cores of dot groups are formed in an AM screen manner by the multi-gradation-level dither process, and outer edges of the dot groups are grown in an FM screen manner by the FM screen process.

As mentioned, in the aforementioned embodiment, the multi-gradation-level dither processing unit 33 performs a multi-gradation-level dither process for a target image. The screen processing unit 34 performs an FM screen process for the target image for which the multi-gradation-level dither process has been performed. Further, in the multi-gradation-level dither process, the multi-gradation-level dither processing unit 33 (a) selects each pixel in the target image as a target pixel in turn, (b) using a conversion characteristic corresponding to each local pixel position group in a unit matrix, converts a pixel value of the target pixel to one of: (b1) a minimum gradation level, (b2) a maximum gradation level and (b3) an intermediate gradation level corresponding to the pixel value of the target pixel, and sets a pixel value of each pixel in the unit matrix as a pixel value obtained with the conversion characteristic.

Consequently, both concentration of halftone dots and dispersed growth of halftone dots are obtained at a low cost. Thus, it is achieved by setting respective values of a parameter of the conversion characteristic such as the aforementioned threshold values for the local pixel position groups in the unit matrix, and therefore, a large capacity is not required of the SRAM that is relatively expensive. In addition, in an intermediate gradation level part, a feature of AM screen dominantly appears and in a highlight part or a shadow part, a feature of FM screen dominantly appears, and consequently, favorable image quality is provided.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, if a property of the target pixel is a character property, the image processing apparatus 14 may not perform the multi-gradation-level dither process but perform the FM screen process is performed; and if a property of the target pixel is a photograph property, the image processing apparatus 14 may perform both the multi-gradation-level dither process and the FM screen process.

Further, in the aforementioned embodiment, if a pixel value of each pixel in the unit matrix is set as the intermediate gradation level, a random number may be added to the pixel value of each pixel in the unit matrix by the multi-gradation-level dither processing unit 33 or the screen processing unit 34. In such cases, consequently, texture banding is restrained.

What is claimed is:

1. An image processing apparatus, comprising:
a multi-gradation-level dither processing unit configured to perform a multi-gradation-level dither process for a target image; and
a screen processing unit configured to perform an FM screen process for the target image for which the multi-gradation-level dither process has been performed;
wherein in the multi-gradation-level dither process, the multi-gradation-level dither processing unit (a) selects each pixel in the target image as a target pixel in turn, (b) using a conversion characteristic corresponding to each local pixel position group in a unit matrix, convert a pixel value of the target pixel to one of: (b1) a minimum gradation level, (b2) a maximum gradation level and (b3) an intermediate gradation level corresponding to the pixel value of the target pixel, and set a pixel value of each pixel in the unit matrix as a pixel value obtained with the conversion characteristic; wherein each local pixel position group has a threshold range; each said threshold range being a subset of a gradation level range; said gradation level range comprising of pixel values between the minimum gradation level and the maximum gradation level; wherein said gradation level range is broken into a number of contiguous threshold ranges; the number of threshold ranges corresponding to the number of local pixel position groups in the unit matrix; wherein each said threshold range comprises of continuous pixel values to cover the gradation level range; and said conversion characteristic of each local pixel position group is based on the corresponding threshold range.

2. The image processing apparatus according to claim 1, wherein the multi-gradation-level dither processing unit (a) converts the pixel value of the target pixel to the minimum gradation level if the pixel value of the target pixel is lower than the threshold range, (b) converts the pixel value of the target pixel to the maximum gradation level if the pixel value of the target pixel is higher than the threshold range, and (c) converts the pixel value of the target pixel to the intermediate gradation level if the pixel value of the target pixel is within the threshold range.

3. The image processing apparatus according to claim 1, wherein if the pixel value of the target pixel is neither the minimum gradation level nor the maximum gradation level, the multi-gradation-level dither processing unit (a) sets a pixel value as the intermediate gradation level using the conversion characteristic in one of local pixel position groups in the unit matrix, and (b) sets a pixel value as either the minimum gradation level or the maximum gradation level in the one or more other local pixel position groups in the unit matrix.

4. The image processing apparatus according to claim 1, wherein the multi-gradation-level dither processing unit (a) selects a conversion characteristic corresponding to a property of the target pixel, (b) using the selected conversion characteristic, converts the pixel value of the target pixel to one of: the minimum gradation level, the maximum gradation level and the intermediate gradation level, and (c) sets a pixel value of each pixel in the unit matrix as the pixel value obtained with the conversion characteristic.

5. The image processing apparatus according to claim 1, wherein if a property of the target pixel is a character property, the multi-gradation-level dither process is not performed and the FM screen process is performed; and
    if a property of the target pixel is a photograph property, both the multi-gradation-level dither process and the FM screen process are performed.

6. The image processing apparatus according to claim 1, wherein if a pixel value of each pixel in the unit matrix is set as the intermediate gradation level, a random number is added to the pixel value of each pixel in the unit matrix by the multi-gradation-level dither processing unit or the screen processing unit.

\* \* \* \* \*